(12) United States Patent
Ohnishi

(10) Patent No.: US 12,122,119 B2
(45) Date of Patent: Oct. 22, 2024

(54) HEAT SEAL DEVICE AND BAG MAKING APPARATUS

(71) Applicant: Totani Corporation, Kyoto (JP)

(72) Inventor: Hideo Ohnishi, Kyoto (JP)

(73) Assignee: Totani Corporation, Kyoto (JP)

( * ) Notice: Subject to any disclaimer, the term of this patent is extended or adjusted under 35 U.S.C. 154(b) by 71 days.

(21) Appl. No.: 18/033,797

(22) PCT Filed: Sep. 15, 2021

(86) PCT No.: PCT/JP2021/033943
§ 371 (c)(1),
(2) Date: Apr. 25, 2023

(87) PCT Pub. No.: WO2022/113486
PCT Pub. Date: Jun. 2, 2022

(65) Prior Publication Data
US 2023/0330962 A1  Oct. 19, 2023

(30) Foreign Application Priority Data

Nov. 30, 2020 (JP) .............................. JP2020-197911

(51) Int. Cl.
*B31B 70/64* (2017.01)
(52) U.S. Cl.
CPC .......... *B31B 70/644* (2017.08); *B31B 70/642* (2017.08)
(58) Field of Classification Search
CPC ... B31B 70/645; B31B 70/262; B31B 70/644; B31B 70/266; B31B 70/36; B31B 70/642; B31B 70/10; B31B 2155/0014; B31B 2160/20; B29C 66/8511; B29C 66/43; B29C 66/1122; B29C 66/8161; B29C 66/346; B29C 66/81427; B29C 66/924; B29C 66/244; B29C 66/8322; B29C 66/8163; B29C 66/92451; B29C 65/18; B29C 65/7891; B29C 65/26; B29L 2031/7128
See application file for complete search history.

(56) References Cited

FOREIGN PATENT DOCUMENTS

| | | | |
|---|---|---|---|
| EP | 0855264 A1 * | 7/1998 | ........... B65B 7/2878 |
| EP | 3486080 | 5/2019 | |
| EP | 3798147 | 3/2021 | |
| JP | 2018076090 | 5/2018 | |
| WO | 2018012542 | 1/2018 | |
| WO | 2019225266 | 11/2019 | |

OTHER PUBLICATIONS

Translation of EP 0855264 A1 (Year: 1998).*

* cited by examiner

*Primary Examiner* — Thomas M Wittenschlaeger
(74) *Attorney, Agent, or Firm* — JCIPRNET

(57) ABSTRACT

A heat seal device includes at least two primary biasing members and a secondary biasing member. These biasing members are located between a slider and a first heat seal member to bias the first heat seal member towards a second heat seal member when bag components are sandwiched by the first and second heat seal members. The primary biasing members are arranged in a straight line in the first horizontal direction. The secondary biasing member is arranged offset from the primary biasing members in a second horizontal direction perpendicular to the first horizontal direction. The heat seal device is configured to allow adjustment of biasing force applied to the first heat seal member by the secondary biasing member.

7 Claims, 11 Drawing Sheets

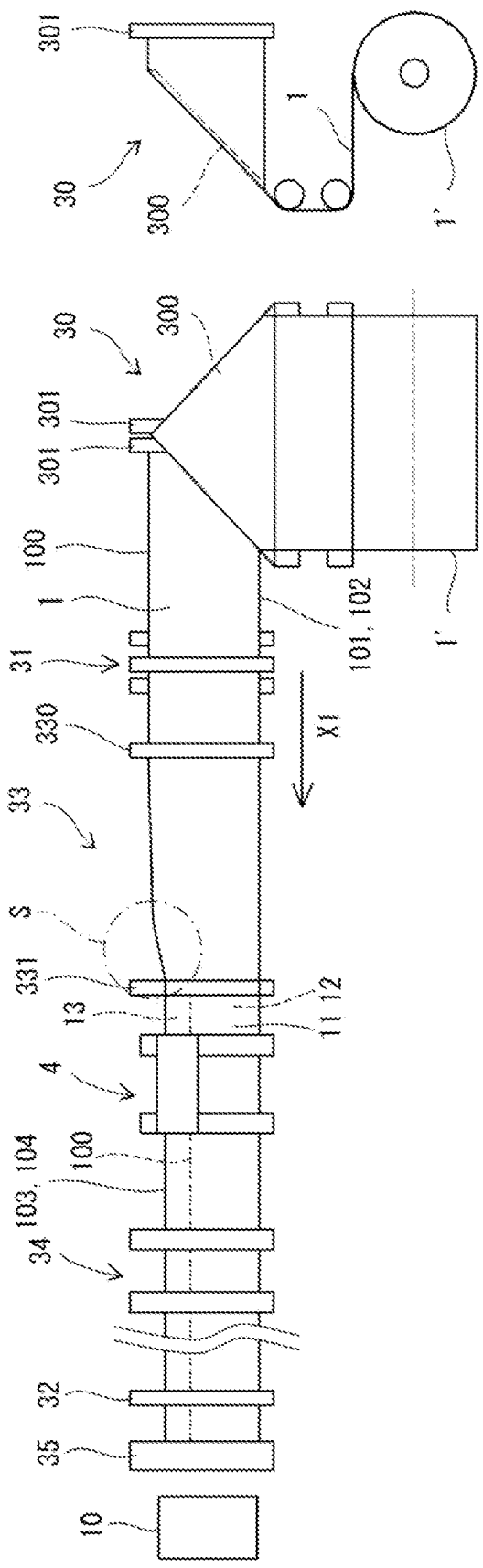
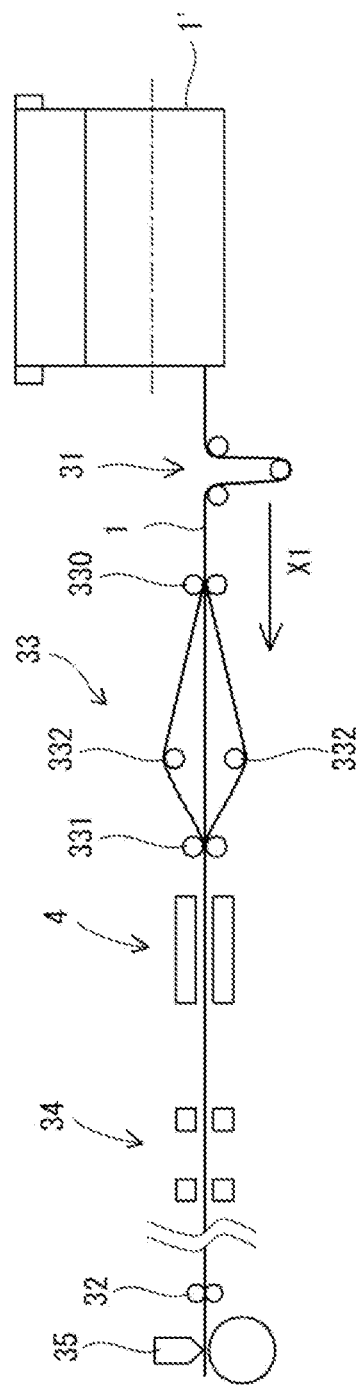
FIG. 1A
FIG. 1B
FIG. 1C

HEAT SEAL DEVICE AND BAG MAKING APPARATUS

CROSS-REFERENCE TO RELATED APPLICATION

This application is a 371 application of International PCT application serial no. PCT/JP2021/033943, filed on Sep. 15, 2021, which claims the priority benefit of Japan application no. 2020-197911, filed on Nov. 30, 2020. The entirety of each of the above-mentioned patent applications is hereby incorporated by reference herein and made a part of this specification.

TECHNICAL FIELD

The present application relates to a heat seal device for use in a bag making apparatus. The present application also relates to a bag making apparatus comprising the heat seal device.

BACKGROUND

The bag making apparatuses disclosed in Patent documents 1 and 2 include a heat seal device that heat-seals bag components prior to shaping a bag (cross-cutting process). The bag component is, for example, a continuous panel part or a continuous or sheet-shaped gusset part (side gusset part, bottom gusset part, or top gusset part). The heat seal device heat-seals two continuous panel parts to each other or heat-seals the gusset part to the panel part. The direction of heat-sealing is generally the width or longitudinal direction of the continuous panel part.

The direction of heat-sealing may be oblique with respect to the width and longitudinal directions of the continuous panel part. For example, the heat seal device disclosed in Patent document 3 heat-seals the gusset part to the panel part to form a V-shaped oblique sealed section.

Such a heat seal device heat-seals the bag components by sandwiching the bag components between first and second heat seal members that are being heated. Thus, at least the first heat seal member has a surface which has a shape of the sealed section to be formed and is to be pressed against the bag component.

The heat seal device has at least two biasing members that bias the first heat seal member towards the second heat seal member when sandwiching the bag components between the first and second heat seal members. The at least two biasing members are spaced from one another and arranged in a straight line extending horizontally. The biasing force of the respective biasing members is applied to the bag components via the first heat seal member. The biasing members are springs or cylinders (see Patent documents 1 and 2).

Applying the force uniformly to the bag components will result in a better finish of the sealed section. For this purpose, the centroid of said surface of the first heat seal member should be on the line of action (extending in the vertical direction) of the combined biasing force of the biasing members. Such a condition allows uniform seal pressure to be applied over the entire area of said surface, resulting in a high-quality seal.

The shape and/or position of the sealed section may also have to be changed according to the design of the bag, such as the shape and size of the bag to be made, the size of the gusset part, and so on. In this case, the first heat seal member should be changed to one with a different shape, or the position of the first heat seal member should be changed.

However, such a change may cause the centroid of said surface of the first heat seal member to shift from the line of action of the combined force of the biasing members. In particular, it frequently happens in practice that the centroid is displaced from the arrangement line of the biasing members. This displacement may impair the uniform application of the biasing force and result in a poor finish of the sealed section.

CITATION LIST

Patent Document

Patent document 1: JP 2018-76090A
Patent document 2: WO2019/225266A1
Patent document 3: WO2018/012542A1

SUMMARY

An object of the present application is to provide a heat seal device capable of adjusting a line of action of the combined biasing force of biasing members in a horizontal direction perpendicular to an arrangement line of primary biasing members, and a bag making apparatus including the heat seal device.

According to an aspect of the present application, there is provided a heat seal device for heat-sealing bag components, including: a pair of supports disposed to be spaced from one another in a first horizontal direction; a beam supported by the pair of supports and extending in the first horizontal direction between the pair of supports; a slider configured to be movable in a vertical direction with respect to the beam; a first heat seal member configured to be moved together with the slider in the vertical direction; a second heat seal member facing the first heat seal member in the vertical direction; a vertical movement mechanism for moving the pair of supports and the beam in the vertical direction to move the slider and the first heat seal member towards and away from the second heat seal member; at least two primary biasing members located between the slider and the beam to bias the slider and the first heat seal member towards the second heat seal member when the bag components are sandwiched between the first and second heat seal members; and a secondary biasing member located between the slider and the beam to bias the slider and the first heat seal member towards the second heat seal member when the bag components are sandwiched between the first and second heat seal members, wherein the at least two primary biasing members are arranged in a straight line in the first horizontal direction, wherein the secondary biasing member is arranged offset from the at least two primary biasing members in a second horizontal direction perpendicular to the first horizontal direction; and wherein the heat seal device is configured to allow adjustment of biasing force applied to the first heat seal member by the secondary biasing member.

The heat seal device may be configured to allow the secondary biasing member to be adjusted to a state in which the secondary biasing member does not bias the first heat seal member when the bag components are sandwiched between the first and second heat seal members.

The first heat seal member may include: a base; and a seal plate configured to be detachably attached to the base. The seal plate may include a convex portion having a surface that faces the second heat seal member when the seal plate is attached to the base. The heat seal device may be configured to sandwich the bag components between the seal plate and the second heat seal member to heat-seal the bag components for forming a sealed section having a shape of the surface of the convex portion.

The first heat seal member may be configured such that the seal plate is attachable to the base at a plurality of different positions with respect to the second horizontal direction.

The secondary biasing member may be a spring or cylinder.

The at least two primary biasing members may be springs or cylinders.

According to another aspect of the present application, there is provided a bag making apparatus including the above heat seal device.

BRIEF DESCRIPTION OF THE DRAWINGS

FIG. 1A is a schematic plan view of an example bag making apparatus, FIG. 1B is a front view of FIG. 1A, and FIG. 1C is a side view of FIG. 1A.

DETAILED DESCRIPTION

Figure 2A:
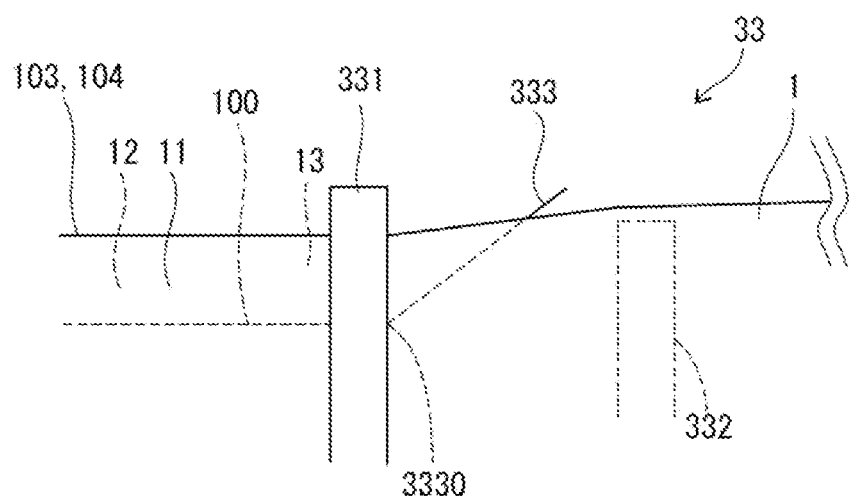
FIG. 2A is an enlarged plan view of a region S in FIG. 1A.

The implementations according to the present application will now be described with reference to the drawings.

An example bag making apparatus is illustrated in FIG. 1A to FIG. 1C. The bag making apparatus successively makes bags 10 from a web 1. The web 1 is continuously unrolled from a roll 1' at a constant speed in its longitudinal direction (its continuous direction) and then folded in half by a first folding device 30. The first folding device 30 includes a triangular plate 300 and a pair of sucking rollers 301. As the web 1 is fed, it is folded in half along its longitudinal centerline by the triangular plate 300 and the sucking rollers 301. The reference sign 100 in FIG. 1A designates a folded edge resulting from folding the web 1 in half. The reference signs 101 and 102 in FIG. 1A designate both side edges of the web 1 aligned with each other as a result of folding the web 1 in half.

The web 1 which has been folded in half is then appropriately switched from continuous feed to intermittent feed by a dancer device 31 including a dancer roller. A feed device 32 including a pair of feed rollers is disposed in the downstream section of the bag making apparatus to intermittently feed the web 1 in the longitudinal direction of the web 1. The feed direction of the web 1 is designated by the reference sing X1.

The web 1 is then further folded by a second folding device 33 such that two continuous panel parts 11 and 12 and a continuous gusset part 13 folded and interposed between these panel parts 11 and 12 are formed from the web 1. The panel parts 11 and 12 and the gusset part 13 are the components of the bags 10.

The second folding device 33 includes a pair of expansion rollers 332 (FIG. 1B) disposed downstream of a pair of guide rollers 330 and upstream of a pair of guide rollers 331. The web 1 which has been folded in half is expanded by the expansion rollers 332 in the section from the guide rollers 330 to the guide rollers 331.

Figure 2B:
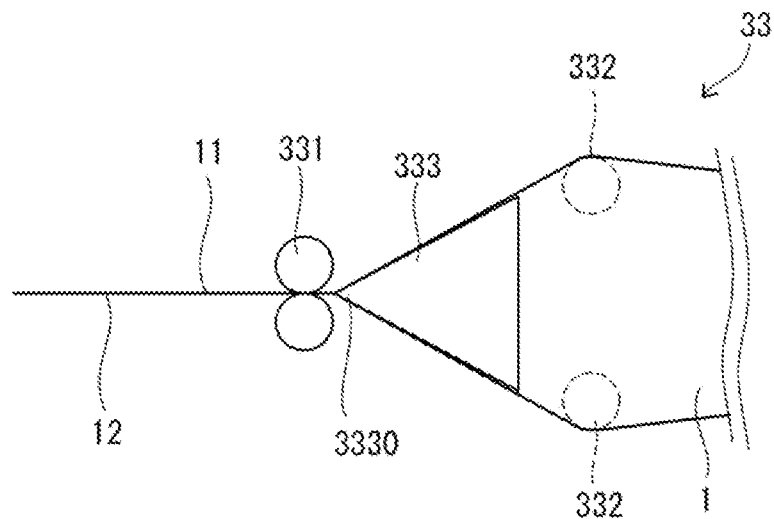
FIG. 2B is a rear view of FIG. 2A.

FIG. 2A is an enlarged plan view of a region S in FIG. 1A. The second folding device 33 further includes a formation plate 333 located downstream of the expansion rollers 332 and upstream of the guide rollers 331. FIG. 2B is a rear view of the region S. The formation plate 333 has a triangular shape. The formation plate 333 is arranged so as to contact with the portion including the folded edge 100 from the outside. The formation plate 333 narrows downstream toward the web 1, and one apex 3330 thereof, which is a downstream end of the formation plate 333, enters in the web 1, and contacts with the folded edge 100 of the web 1 near the guide rollers 331.

As the web 1 is fed, the portion including the folded edge 100 is folded back in the opposite direction along the folded edge 100 by the formation plate 333 to enter between the two layers of the web 1. Then, in this state, the web 1 is fed through the pair of guide rollers 331.

This causes the portion including the folded edge 100 to be folded and interposed between the two layers of the web 1, so that it results in the continuous gusset part 13 folded in half, and that the two layers of the web 1 result in the two continuous panel parts 11 and 12. The folded edge 100 results in an inner edge of the gusset part 13. Reference numerals 103 and 104 in FIG. 2A designate the edges of the panel parts 11 and 12, and also the outer edges of the gusset part 13, that is, the border edges between the gusset part 13 and the panel parts 11, 12. Thereafter, the web 1 is fed in a state of being folded in this way.

It is possible to adjust the interposed length of the gusset part 13 into the panel parts 11 and 12, i.e., the gusset depth, depending on the position of the formation plate 333.

Figure 2C:
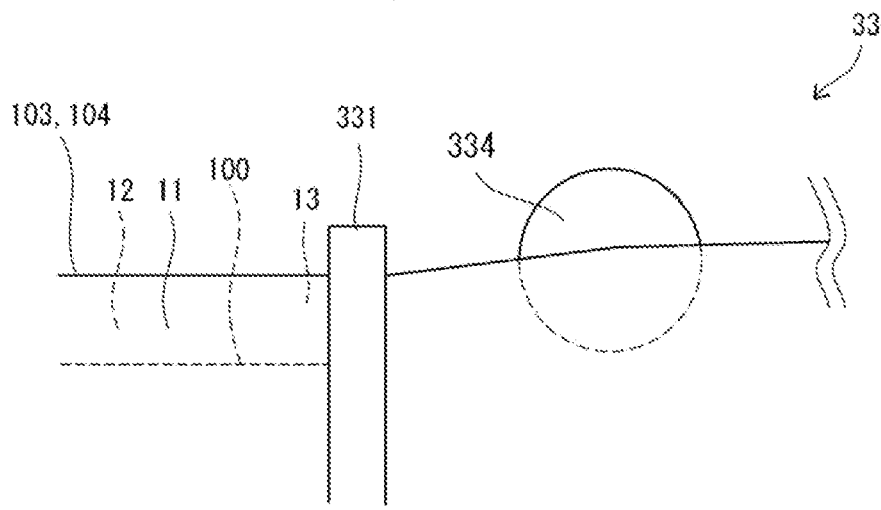
FIG. 2C is a schematic partial plan view of another example second folding device.

FIG. 2C illustrates an alternative example of the second folding device 33. Instead of the formation plate 333, the second folding device 33 may fold and interpose the portion including the folded edge 100 using a well-known folding plate 334 and an inner guide plate (not illustrated). In this case, it is possible to adjust and determine the interposed length of the gusset part 13 depending on the position of the folding plate 334.

Figure 3:
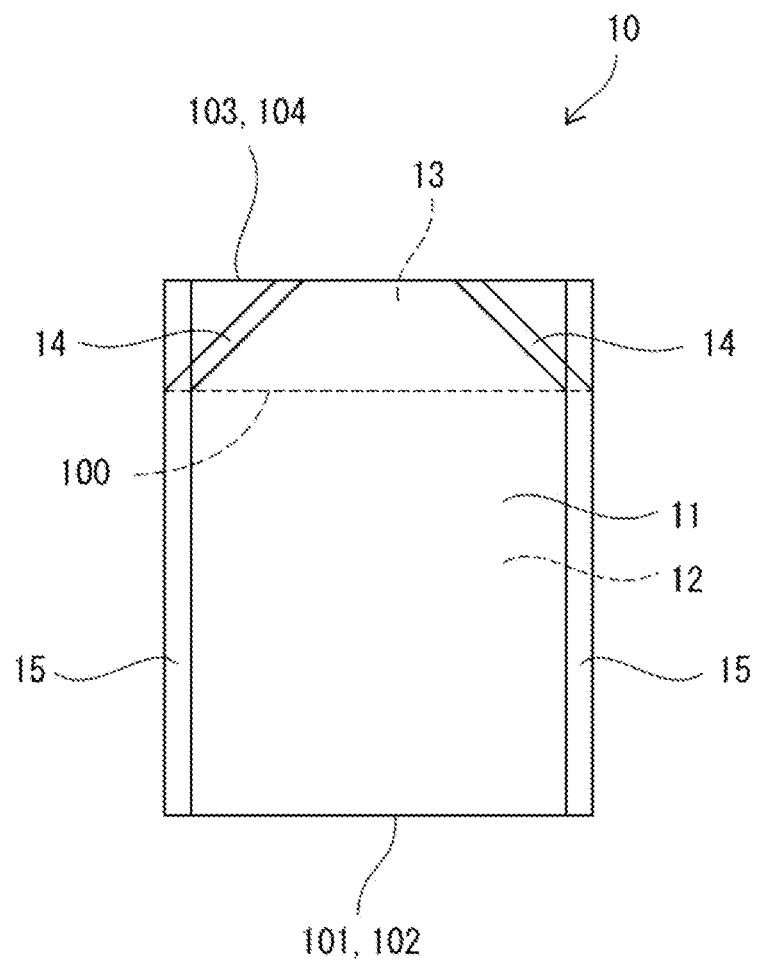
FIG. 3 is a detailed view of a bag in FIG. 1A.

Referring back to FIG. 1A and FIG. 1B, the bag making apparatus includes a heat seal device 4 disposed downstream of the second folding device 33 to heat-seal the gusset part 13 to the panel parts 11 and 12 during every intermittent feed cycle of the web 1, thereby forming a sealed section 14 (FIG. 3). The configuration of the heat seal device 4 will be described in more detail below.

The bag making apparatus includes a cross seal device 34 disposed downstream of the heat seal device 4 to seal the panel parts 11 and 12 and the gusset part 13 in the form of heat seal or ultrasonic seal in the width direction of the panel parts 11 and 12 during every intermittent feed cycle of the web 1, thereby forming a cross sealed section 15 (FIG. 3). The cross seal device 34 in the implementation, for example, heat-seals the bag components 11, 12 and 13 using two pairs of heat seal bars.

The bag making apparatus further includes a cross cut device 35 disposed downstream of the cross seal device 34 and the feed device 32 to cross-cut the panel parts 11 and 12 and the gusset part 13 in the width direction of the panel parts 11 and 12 during every intermittent feed cycle of the web 1. The bag 10 is made every cross-cutting. The position of cross-cutting is the position of the cross sealed section 15. The cross cut device 35 cross-cuts the bag components 11, 12 and 13 using, for example, a cutter and a receiving stage.

FIG. 3 illustrates the bag 10 in FIG. 1A. The gusset part 13 functions as a bottom gusset part that provides self-standability for the bag 10. The sealed sections 14 reinforce the self-standability of the bag 10. The sealed section 14 has a V-shape before the cross-cut process. The sealed section 14 is divided into two in cross-cutting. As a result, the sealed sections 14 are oblique sealed sections located on both sides of the bag 10 and extending in the longitudinal and lateral direction of the bag 10. The edges 101 and 102 result in the open edge of the bag 10.

Figure 4:
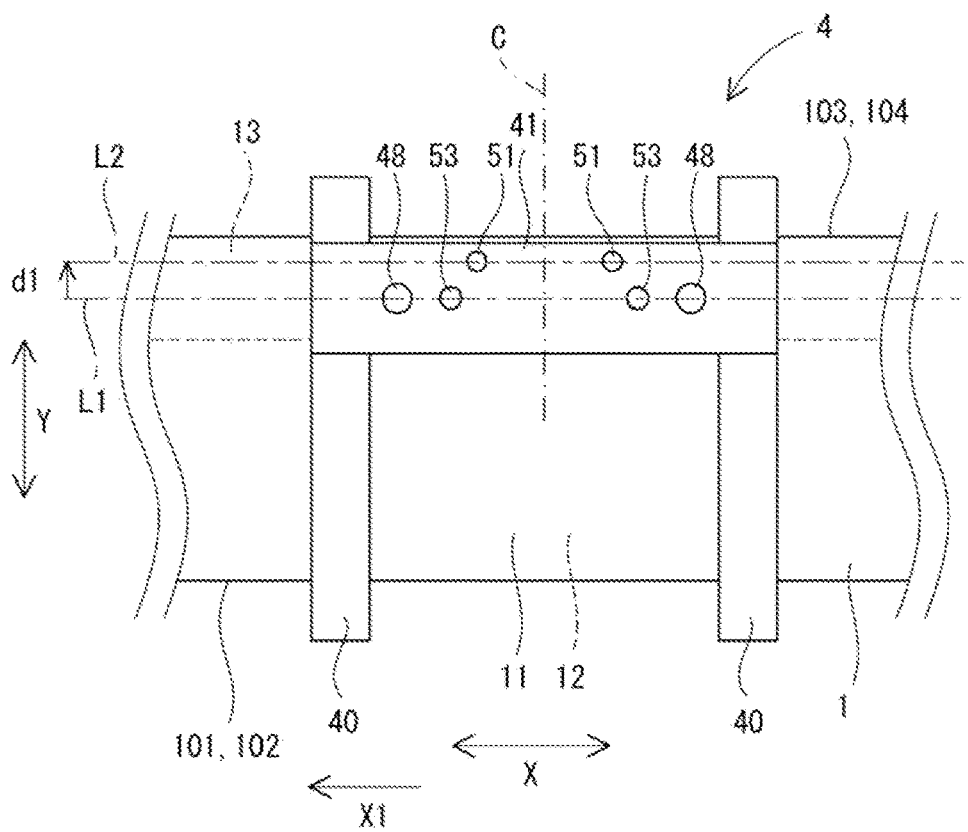
FIG. 4 is a schematic plan view of an example heat seal device.
Figure 5:
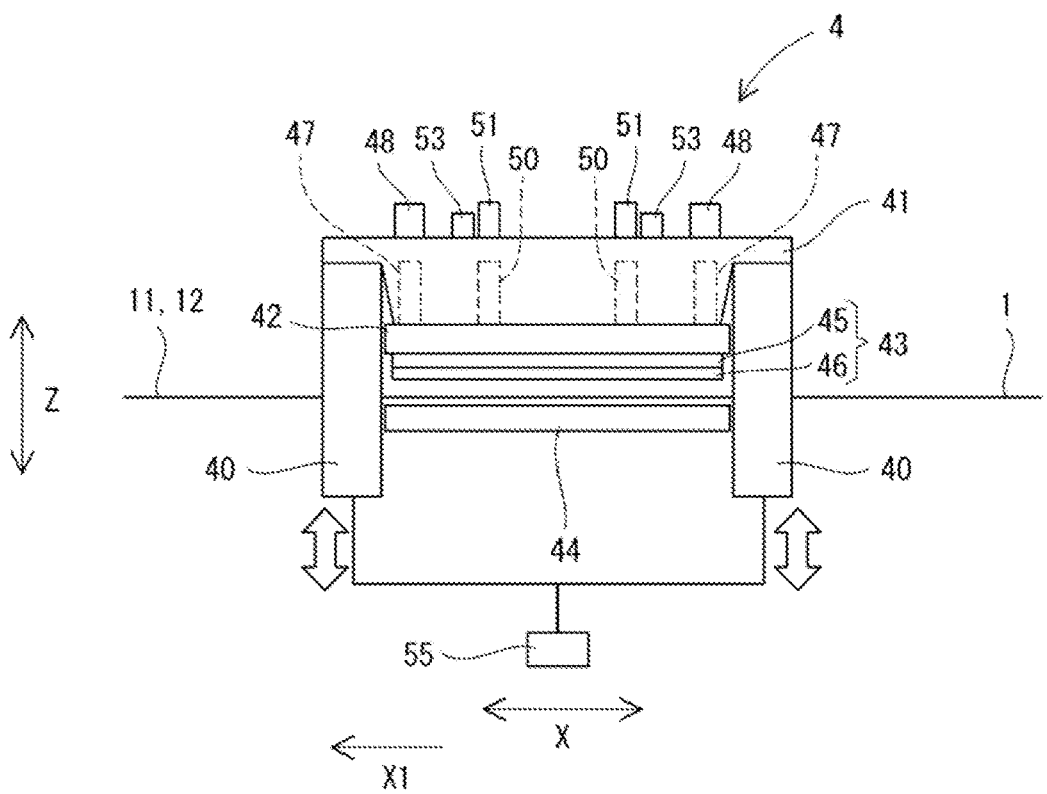
FIG. 5 is a front view of the heat seal device in FIG. 4.

The heat seal device 4 will be described below. As illustrated in FIG. 4, the heat seal device 4 includes a pair of supports 40 spaced from one another in the first horizontal direction X. The first horizontal direction X in the implementation is the longitudinal direction of the continuous panel parts 11 and 12, and thus is the feed direction X1. Each of the supports 40 extends in the second horizontal direction Y across the entire width of the panel parts 11 and 12 which are being on the feed path, as illustrated in FIG. 4 and also extends in the vertical direction Z adjacent to the panel parts 11 and 12 as illustrated in FIG. 5. The second horizontal direction Y is perpendicular to the first horizontal direction X, and in the implementation, is the width direction of the panel parts 11 and 12.

The heat seal device 4 further includes a beam 41 supported directly or indirectly via a suitable member by a pair of supports 40 and extending in the first horizontal direction X between the pair of supports 40. The beam 41 is mounted at both ends thereof on the horizontal extending portions of the supports 40. The beam 41 can be adjusted in the second horizontal direction Y with respect to the supports 40 by changing its fixed position. The beam 41 is located above the panel parts 11 and 12 which are being on the feed path.

As illustrated in FIG. 5, the heat seal device 4 further includes a slider 42 provided for the beam 41 to be movable in the vertical direction with respect to the beam 41. The slider 42 is located below the beam 41.

The heat seal device 4 further includes a first heat seal member 43 and a second heat seal member 44. The first heat seal member 43 is attached to the slider 42 opposite the panel parts 11 and 12 to be moved together with the slider 42 in the vertical direction Z.

In the implementation, the first heat seal member 43 includes a base 45 attached to the slider 42 and a seal plate 46 configured to be detachably attached to the base 45.

Figure 7:
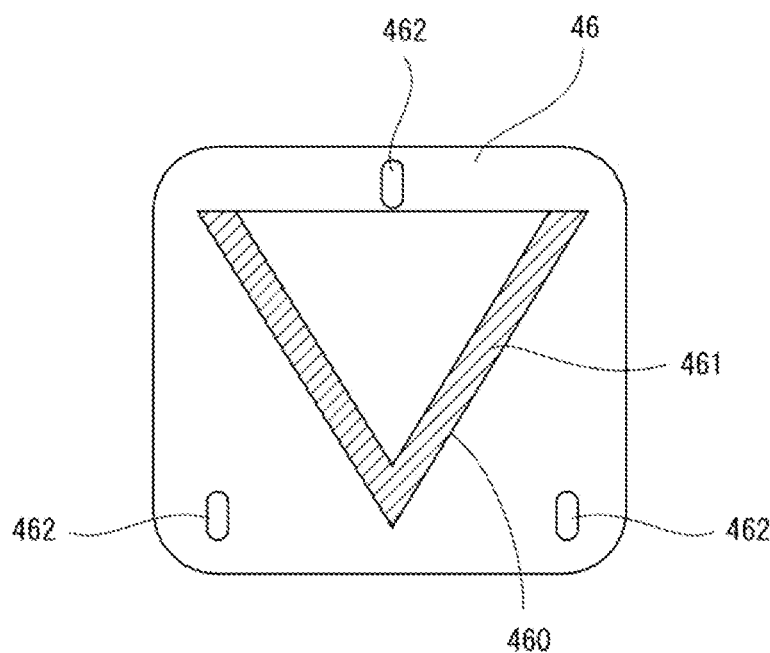
FIG. 7 is a view of an example seal plate.

The seal plate 46 has a convex portion 460 as illustrated in FIG. 7. For example, this convex portion 460 is integrally formed on a plate portion of the seal plate 46 and protrudes from the plate portion. The convex portion 460 has a flat surface 461 that faces the second heat seal member 44 when the seal plate 46 is attached to the base 45. This surface 461 is a surface to be pressed against the bag components 11, 12 and 13 during heat-sealing as described below. The surface 461 has a corresponding shape to the sealed section 14 to be formed. Thus, the surface 461 in the implementation has the V-shape.

The first heat seal member 43 is configured such that the seal plate 46 is attachable to the base 45 at different positions with respect to the second horizontal direction Y. This enables the position of the seal plate 46 to be changed with respect to the base 45 in the second horizontal direction Y. This may be implemented by well-known means, such as, for example, bolts and slots 462 formed in the seal plate 46.

The second heat seal member 44 is disposed opposite the panel parts 11 and 12, and faces the first heat seal member 43 in the vertical direction Z. In the implementation, the first heat seal member 43 is located above the panel parts 11 and 12, and the second heat seal member 44 is located below the panel parts 11 and 12. The surface of the second heat seal member 44 facing the first heat seal member 43 (seal plate 46) may be a flat surface with the same shape as the above surface 461 of the convex portion 460, or a flat surface sufficiently larger than the surface 461. The heat seal device 4 is configured to allow the second heat seal member 44 to be secured in a position that corresponds to the position of the first heat seal member 43.

Figure 6A:
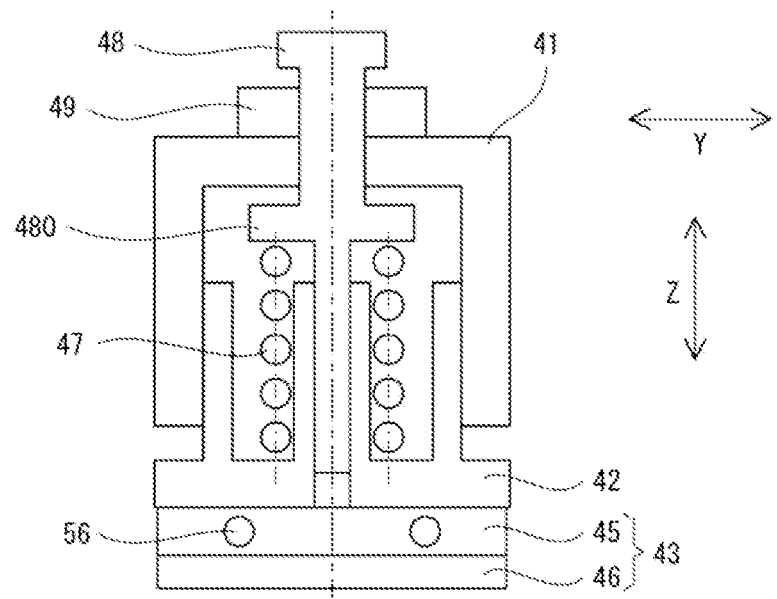
FIG. 6A is a vertical cross-sectional view at a position of a primary biasing member in FIG. 5.

As illustrated in FIG. 5 and FIG. 6A, the heat seal device 4 includes at least two primary biasing members 47 (two biasing members in the implementation) located between the beam 41 and the slider 42. FIG. 6A is a YZ cross-sectional view at the position of the primary biasing member 47 (wherein the second heat seal member is not illustrated). Each of the primary biasing members 47 is a spring in the implementation, and is oriented such that its extending and contracting direction (biasing direction) is the vertical direction Z.

In the implementation where the primary biasing members 47 are springs, pressure bolts 48 are inserted coaxially through the primary springs 47, respectively, and inserted in the slider 42. Each of the primary springs 47 is located between the flange 480 of the pressure bolt 48 and the slider 42. The pressure bolt 48 penetrates through the beam 41 and is adjustable in position in the vertical direction Z with respect to the beam 41 by its outer circumferential threads. In addition, a nut 49 having a double nut configuration is screwed onto the pressure bolt 48. The pressure bolt 48 can be secured to the beam 41 by the double nut configuration. The pressure bolt 48 is configured to be slidable in the vertical direction Z with respect to the slider 42. The maximum distance between the beam 41 and the slider 42 has been set by the adjustment bolts 53 (which will be described below), and the adjustment of the position of the pressure bolts 48 with respect to the beam 41 in the vertical direction Z allows the adjustment of the compression state of the primary springs 47.

Figure 6B:
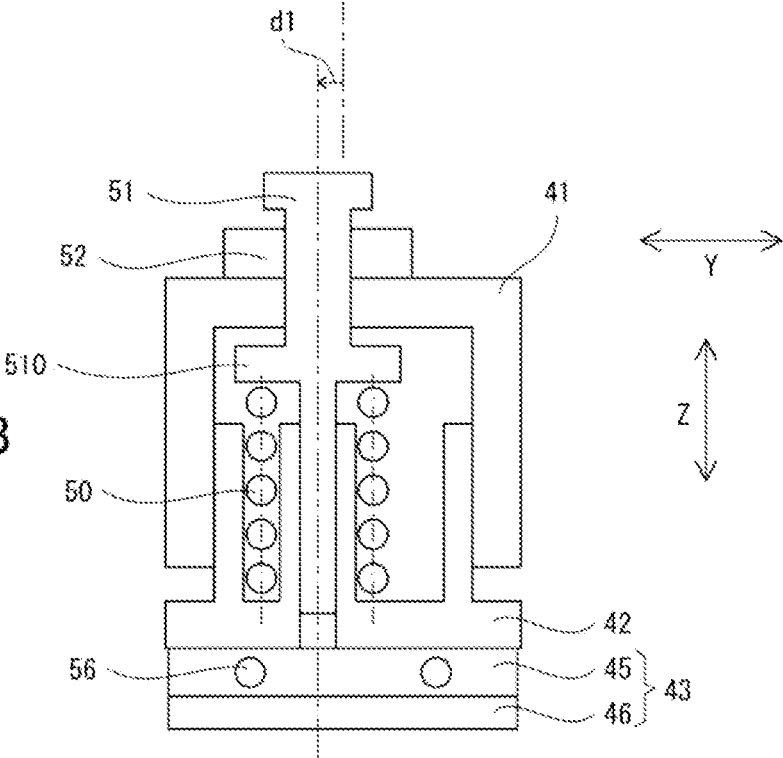
FIG. 6B is a vertical cross-sectional view at a position of a secondary biasing member in FIG. 5.

As illustrated in FIG. 5 and FIG. 6B, the heat seal device 4 includes at least one secondary biasing member 50 located between the beam 41 and the slider 42. In the implementation, two secondary biasing members 50 are provided. FIG. 6B is a YZ cross-sectional view at the position of the secondary biasing member 50 (wherein the second heat seal member is not illustrated).

In the implementation where the secondary biasing members 50 are springs, the pressure bolts 51 are coaxially inserted through the secondary springs 50, respectively, and inserted in the slider 42. Each of the biasing springs 50 is located between the flange 510 of the pressure bolt 51 and the slider 42. The pressure bolt 51 penetrates through the beam 41 and is adjustable in position in the vertical direction Z with respect to the beam 41 by its outer circumferential threads. A nut 52 having a double nut configuration is screwed onto the pressure bolt 51. The bolt 51 can be secured to the beam 41 by the double nut configuration. The pressure bolt 51 is configured to be slidable in the vertical direction Z with respect to the slider 42. The maximum distance between the beam 41 and the slider 42 has been set by the adjustment bolts 53 (which will be described below), and the adjustment of the position of the pressure bolts 51 with respect to the beam 41 in the vertical direction Z allows the adjustment of the compression state of the secondary springs 50.

The primary biasing members 47 are arranged in a straight line in the first horizontal direction X. This arrangement line L1 is illustrated in FIG. 4 (see the position of the corresponding pressure bolts 48). The secondary biasing members 50 are disposed offset from the primary biasing members 47 in the second horizontal direction Y (see the position of the corresponding pressure bolts 51). That is, the arrangement line L2 of the secondary biasing members 50 extending in the first horizontal direction X is spaced away from the arrangement line L1 of the primary biasing members 47 by the predetermined distance d1 in the second horizontal direction Y.

The two secondary primary members 50 in the implementation are symmetrically arranged with respect to the second horizontal direction centerline C (FIG. 4) of the arrangement of the primary biasing members 47.

Figure 8:
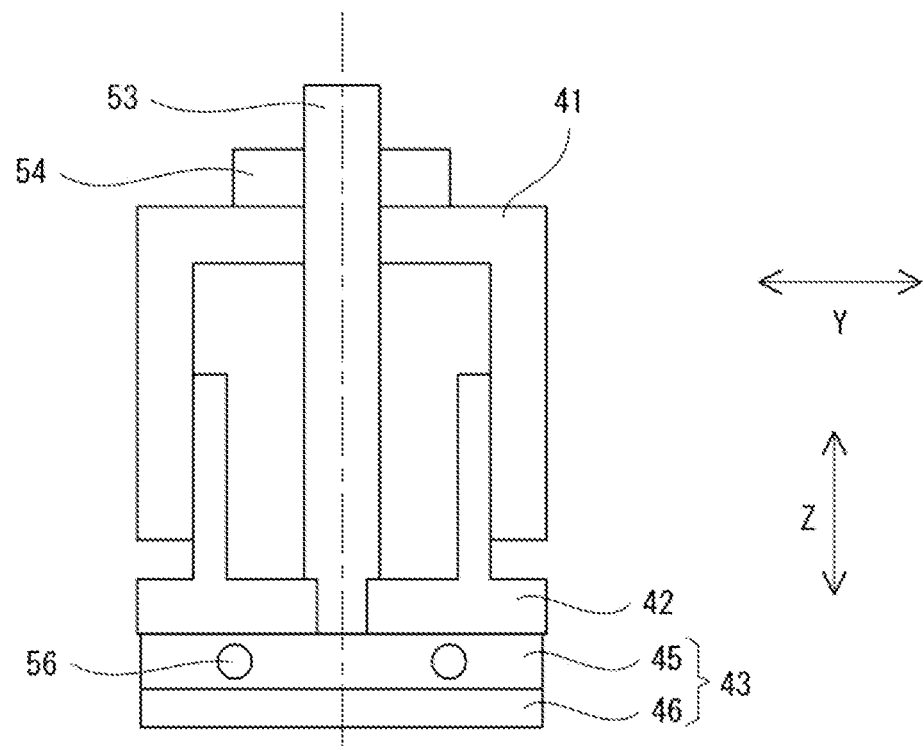
FIG. 8 is a vertical cross-sectional view at a position of an adjustment bolt in FIG. 5.

As illustrated in FIG. 5 and FIG. 8, two adjustment bolts 53 are provided. FIG. 8 is a YZ cross-sectional view at the position of the adjustment bolt 53 (wherein the second heat seal member is not illustrated). The adjustment bolt 53 is fixed to the slider 42. The adjustment bolt 53 is inserted through the beam 41 and configured to be slidable in the vertical direction Z with respect to the beam 41. A nut 54 is screwed onto the adjusting bolt 53. The maximum distance between the beam 41 and the slider 42, and thus the movable range of the slider 42 with respect to the beam 41 can be adjusted using the nut 54. The nut 54 may also be a double nut configuration having an additional nut, thereby preventing the nut position from easily being fluctuated with respect to the adjustment bolt 53.

In the implementation, by adjusting the compression state of the springs 47 and 50 as the biasing members using the above configuration after fixing the above maximum distance, it is possible to adjust the biasing force which is applied to the first heat seal member 43 by the springs 47 and 50 when the bag components 11, 12 and 13 are sandwiched by the first and second heat seal members 43 and 44, and thus adjust the seal pressure, as described below. The heat seal device 4 is configured to allow the secondary springs 50 to be adjusted to a state in which the secondary springs 50 do not bias the first heat seal member 43 towards the second heat seal member 44 when the bag components 11, 12 and 13 are sandwiched by the first and second heat seal members 43 and 44. That is, it is possible to adjust the biasing force applied by the secondary springs 50 towards the first heat seal member 43 during heat-sealing to zero, or in other words, to select not to use the secondary springs 50 during heat-sealing.

As illustrated in FIG. 5, the heat seal device 4 includes a vertical movement mechanism 55 for moving the supports 40 and the beam 41 in the vertical direction Z to move the slider 42 and the first heat seal member 43 towards and away from the second heat seal member 44. This movement in the vertical direction Z causes the bag components 11, 12 and 13 to be sandwiched between the first heat seal member 43 (seal plate 46) and the second heat seal member 44. The vertical movement mechanism 55 moves these members 40 to 43 in the vertical direction Z in conjunction with the intermittent feed of the web 1 by the feed device 32. Such a vertical movement mechanism 55 is well-known, as disclosed in Patent documents 1 and 2.

As illustrated in FIG. 6A and FIG. 6B, the heat seal device 4 includes heat pipes 56 as a heater for heating the first heat seal member 43. The heat pipes 56 in the implementation are incorporated into the first heat seal member 43, more specifically, into its base 45. The heat pipes 56 generate heat under temperature control to heat the first heat seal member 43 to a temperature suitable for heat-sealing.

Figure 9:
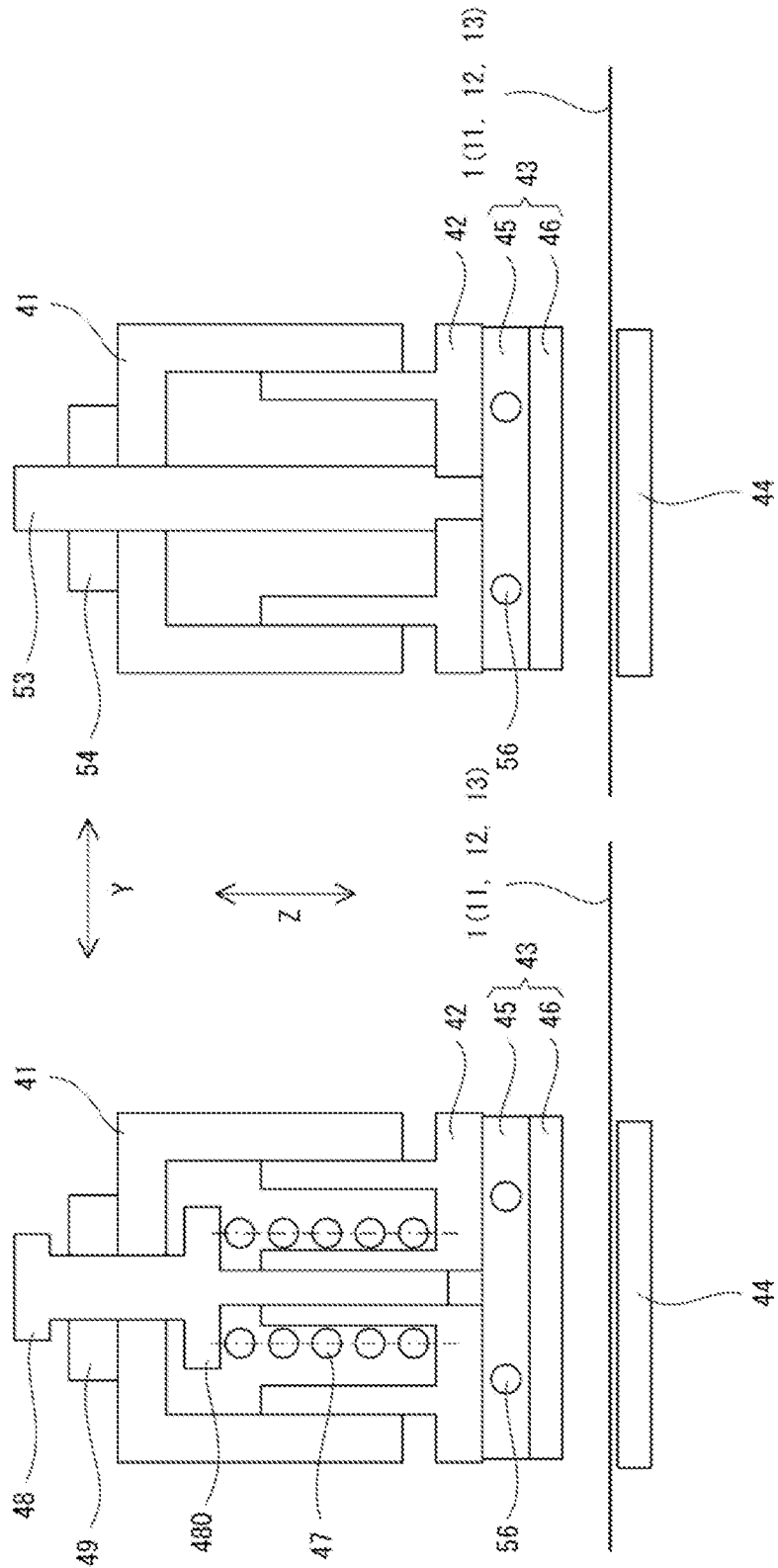
FIG. 9 illustrates heat-sealing operation.
Figure 10:
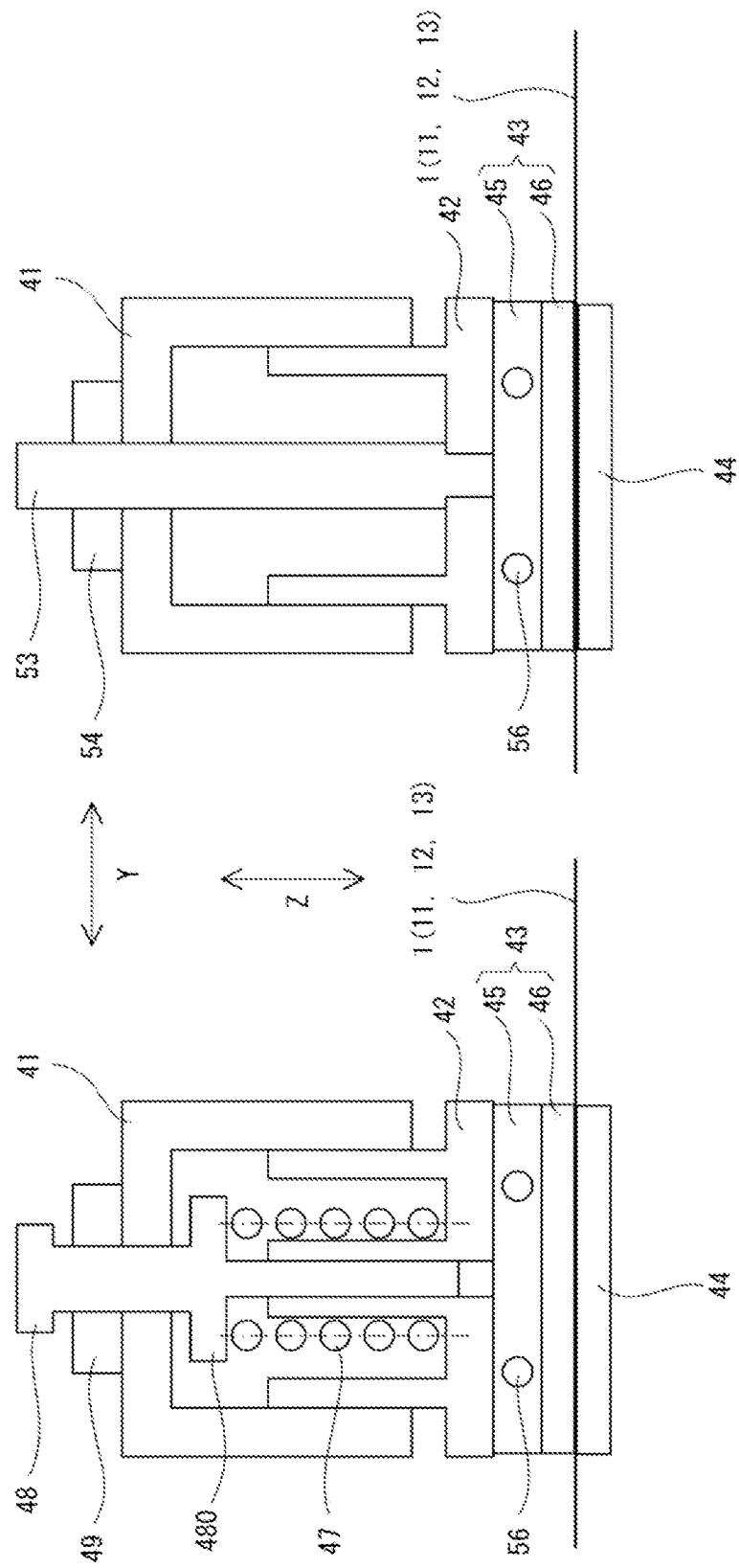
FIG. 10 illustrates heat-sealing operation.
Figure 11:
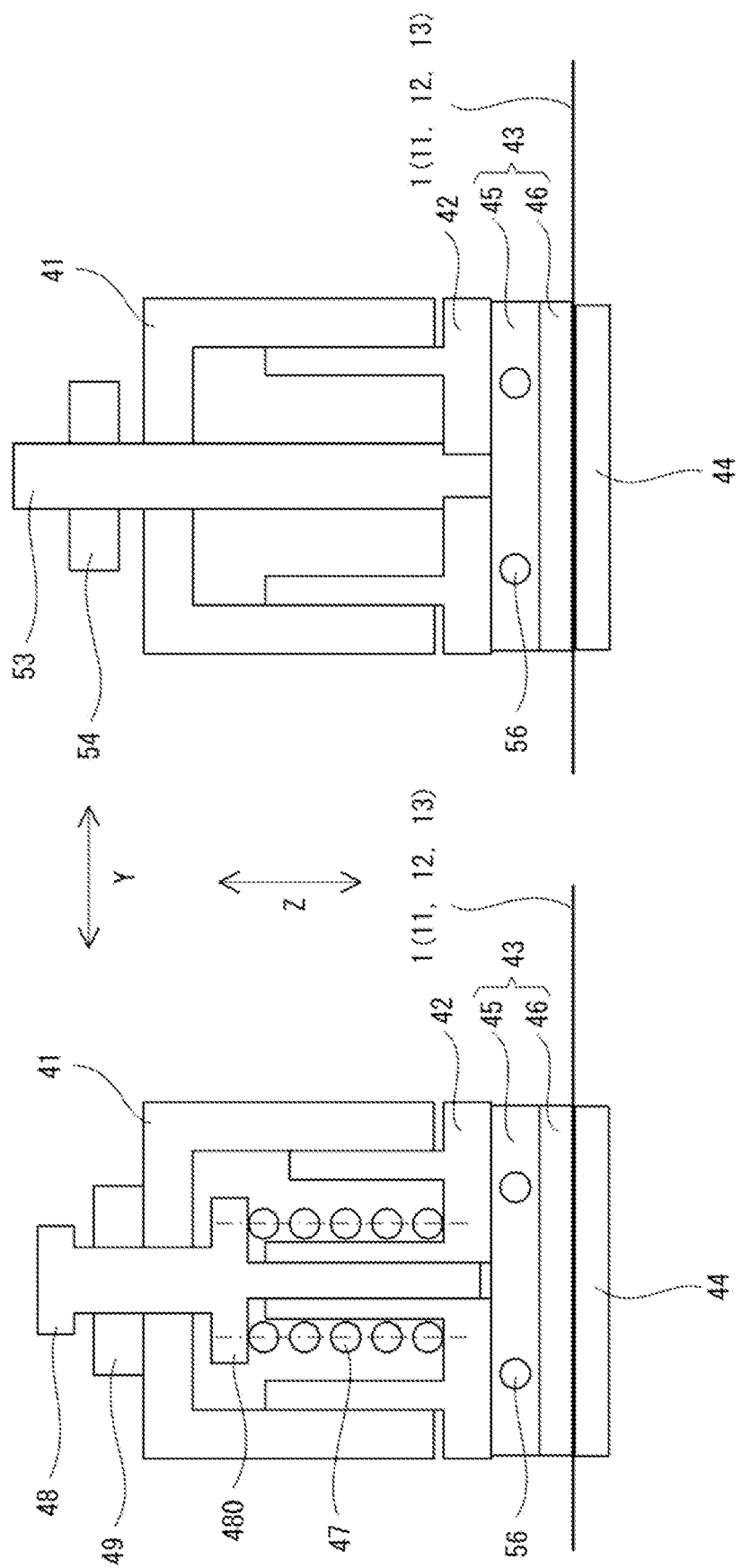
FIG. 11 illustrates heat-sealing operation.

The operation for heat-sealing is described below with reference to FIG. 9 to FIG. 11. The web 1 (i.e., the bag components 11, 12 and 13) is intermittently fed by the feed device 32 to pass through between the first and second heat seal members 43 and 44. When the web 1 is paused in the intermittent feed, the vertical movement mechanism 55 moves the supports 40 and the beam 41 downward to move the slider 42 and the first heat seal member 43 towards the second heat seal member 44, thereby sandwiching the bag components 11, 12 and 13 between the first heat seal member 43 (its seal plate 46) and the second heat seal member 44 (FIG. 9, FIG. 10).

The vertical movement mechanism 55 further moves the supports 40 and the beam 41 downward. At this time, the slider 42 and the first heat seal member 43 fail to move downward any further, and thus stop. Therefore, the beam 41 and the pressure bolt 48 move downward with respect to the slider 42 and the first heat seal member 43 (FIG. 10, FIG. 11). Consequently, the springs as the primary biasing members 47 are compressed between the flange 480 and the slider 42 by the flange 480 to apply their biasing force to the bag components 11, 12 and 13 via the slider 42 and the first heat seal member 43. Where springs as the secondary biasing members 50 are also used additionally, their biasing force is applied in the similar manner.

Thus, the surface 461 of the convex portion 460 (FIG. 7) heated by the heat pipes 56 is pressed against the bag components 11, 12 and 13, thereby heat-sealing the components 11, 12 and 13 to form the sealed section 14 having the same shape as the surface 461. In the implementation, the first heat seal member 43 (seal plate 46) and the second heat seal member 44 sandwich the panel parts 11 and 12 and the gusset part 13 to heat-seal them, thereby forming the V-shaped oblique sealed section 14.

The vertical movement mechanism 55 then returns the supports 40 and the beam 41 to the initial position (FIG. 9) to separate the slider 42 and the first heat seal member 43 from the web 1 and the second heat seal member 44. Then, the web 1 restarts to be fed. The above steps are repeated to form the sealed section 14 every intermittent feed cycle.

For a better finish of the sealed section 14, the centroid of the surface of the first heat seal member 43 to be pressed against the bag components 11, 12 and 13, i.e., the part of the surface 461 to be actually pressed against the bag components 11, 12 and 13 (hereinafter referred to as an effective sealing surface), should match with the line of action (extending in the vertical direction Z) of the combined force of the biasing force applied by the biasing members used in heat-sealing. This ensures that the biasing force is applied uniformly to the bag components 11, 12, and 13 via the effective sealing surface.

Figure 12:
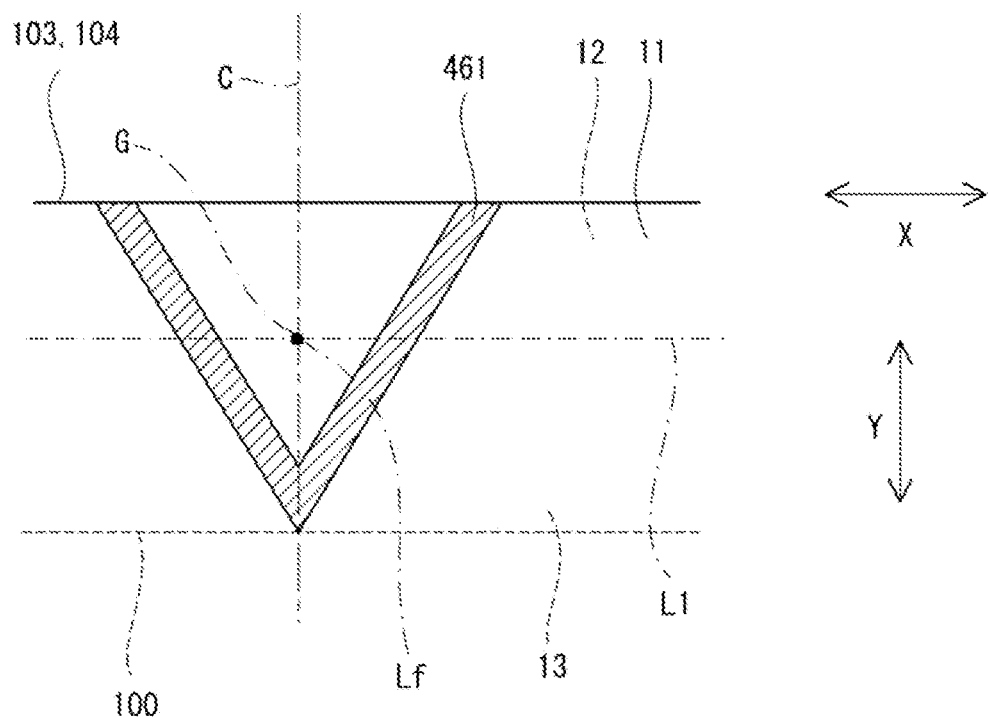
FIG. 12 illustrates a planar positional relationship among bag components, an arrangement line, a convex portion, and a line of action.

As illustrated in FIG. 12, in the case of the implementations which make the bags 10 in which the interposed length of the gusset part 13 (the distance between the edges 103 and 104 of the sheet panel parts 11 and 12 and the folded inner edge 100 of the gusset part 13) is the maximum possible for the bag making apparatus design, the entire surface 461 of the convex portion 460 is the effective sealing surface and thus will be pressed against the panel parts 11 and 12 and the gusset part 13. An operator positions the seal plate 46 on the base 45 after adjusting the position of the seal plate 46 using such means as slots 462 such that the centroid G of the entire surface 461 is in alignment with the intersection of the arrangement line L1 and the second horizontal direction centerline C in the vertical direction Z. Only the biasing members 47 are used, whereas the secondary members 50 are not used. That is, the secondary biasing members 50 are adjusted by the pressure bolts 51 to the state in which they do not bias the first heat seal members 43 during heat-sealing. The line of action Lf of the combined force of the biasing force of the primary biasing members 47 alone is through the intersection of the arrangement line L1 and the second horizontal direction centerline C. Therefore, the centroid G and the line of action Lf match with each other.

Since the centroid G matches with the line of action Lf, the combined biasing force is uniformly transmitted over the entire surface 461, which is the effective sealing surface, to be applied to the panel parts 11 and 12 and the gusset part 13. Consequently, this ensures that the oblique sealed section 14 is well formed.

Figure 13:
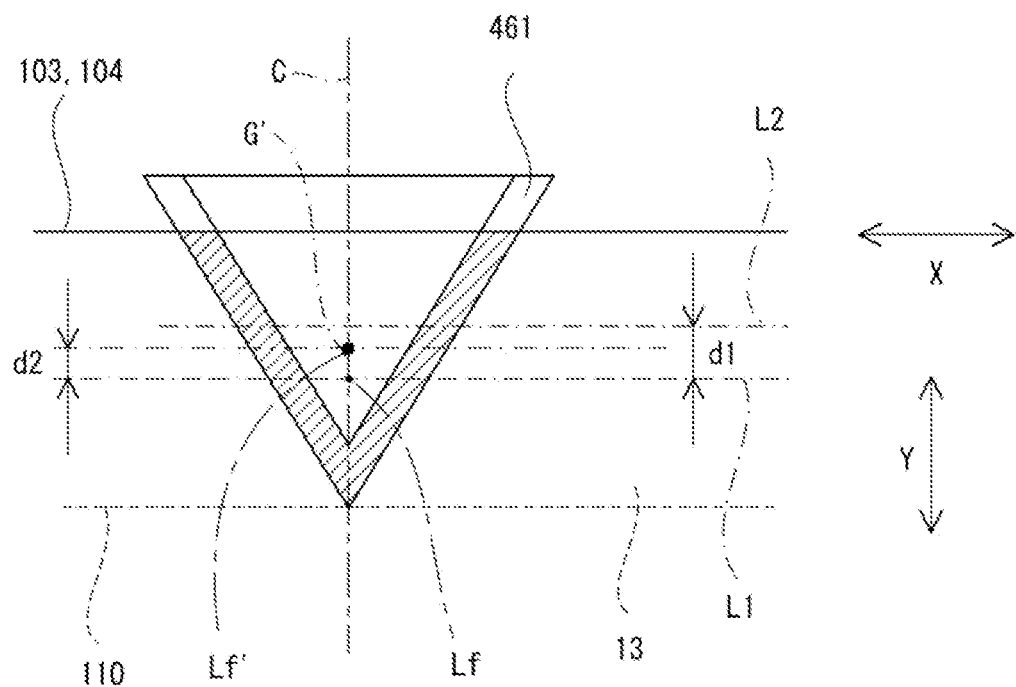
FIG. 13 illustrates a planar positional relationship among bag components, an arrangement line, a convex portion, and a line of action.

As illustrated in FIG. 13, in the case of making bas in which the interposed length of the gusset part 13 is less than the maximum possible for the bag making apparatus design, only the hatched area of the surface 461 in FIG. 13 is the effective sealing surface. Its centroid G' is displaced from the arrangement line L1, i.e., from the line of action Lf of the primary biasing members 47 alone, in the second horizontal direction Y. This displacement is designated by the reference sign d2. If the heat seal device 4 performs heat-sealing in this state, the uniform application of the biasing force may be compromised, resulting in a decrease in the quality of the oblique sealed section 14. Only adjusting the biasing force of the primary biasing members 47 fails to shift the line of action Lf in the second horizontal direction Y.

Therefore, the secondary biasing members 5 are also used additionally such that the line of action Lf of the combined force of the primary biasing members 47 and the secondary biasing members 50 match with the centroid G'. For this purpose, the following two equations should be satisfied with the required combined biasing force as F, the biasing force of the primary biasing members as F1, and the biasing force of the secondary biasing members as F2. Therefore, an operator adjusts the force F1 and the force F2 using the pressure bolts 48 and 51 to satisfy the following two equations.

$$F = F1 + F2$$

$$F1:F2 = (d1-d2):d2$$

In this manner, it is possible to adjust the line of action Lf in the second horizontal direction Y to match it with the centroid G' using the secondary biasing members 50. This enables the uniform application of the seal pressure even when the interposed length of the gusset part 13 is changed. This prevents the poor quality of the oblique sealed section 14, thereby also preventing problems such as leakage of contents from the oblique sealed section 14.

The heat seal device 4 is capable of adjusting the line of action of the combined force of the biasing members at least in the second horizontal direction Y by adjusting the biasing force of the secondary biasing members 50, as described in the above example. This enables the seal pressure to be applied uniformly even when the centroid of the effective sealing surface of the first heat seal member 43 is shifted from the arrangement line L according to the design change of the bag 10 or other reasons.

Figure 14A:
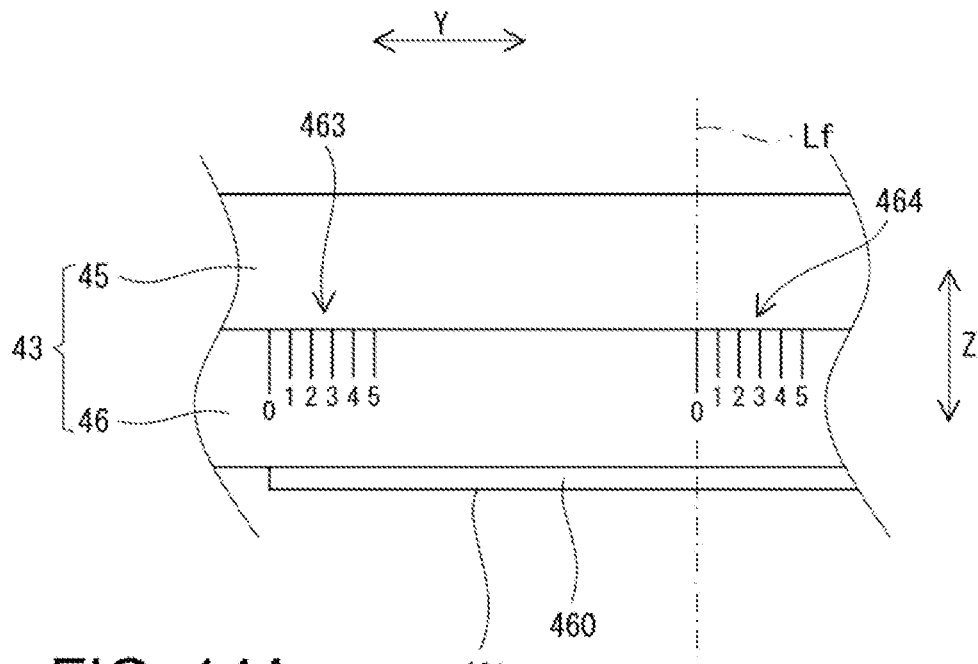
FIG. 14A and FIG. 14B illustrate adjustment of a line of action to a centroid.
Figure 14B:
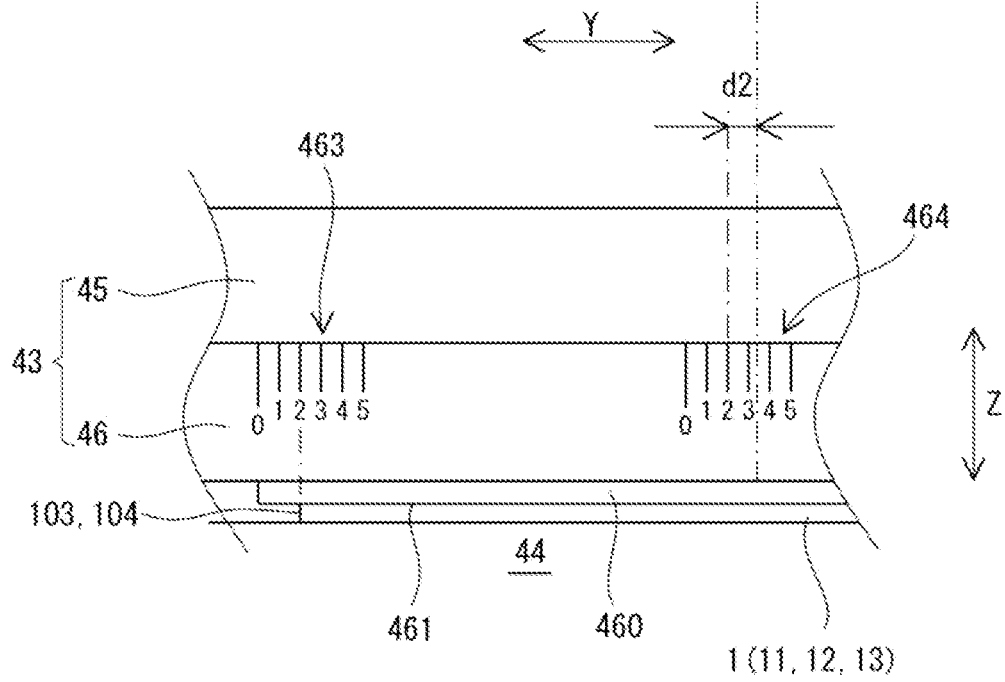

In the implementation, the edge guideline 463 and the centroid guideline 464 may be formed on the seal plate 46 at a predetermined pitch, for example, in the form of an engraving, as illustrated in FIG. 14A and FIG. 14B. Both of the guidelines 463 and 464 are formed at a location easily visible to an operator, in the implementation, on the side surface of the plate portion of the seal plate 46, as illustrated in FIG. 14A. Both of the guidelines 463 and 464 may be formed on the surface of the plate portion on the side of the convex portion 460.

For example, in the case of making the bags 10 in which the interposed length of the gusset part 13 is the maximum possible for the bag making apparatus design, the seal plate 46 is positioned with respect to the base 45 using well-known means such as slots 462 such that the edges 103 and 104 are aligned with the "0" scale of the edge guideline 463. At this time, the centroid G of the effective sealing surface is aligned with "0" scale of the centroid guideline 464. In addition, the line of action Lf of the primary biasing members 47 alone is aligned with the "0" scale of the centroid guideline 464.

As illustrated in FIG. 14A, in the case of making bas in which the interposed length of the gusset part 13 is less than the maximum possible for the bag making apparatus design, the centroid G' of the effective sealing surface is aligned with the "2" scale of the centroid guideline 464, if the end edges 103 and 104 are aligned with the "2" scale of the edge guideline 463. Therefore, an operator should operate the pressure bolts 51 to also involve the secondary biasing members 50 in heat-sealing and to shift the line of action from the position of the line of action Lf of the primary biasing members 47 alone, by d2, in the second horizontal direction Y (width direction of the panel 11 and 12), thereby adjusting it to the centroid G'.

In this manner, both guidelines 463 and 464 are configured such that the positional relationship between the scales of the edge guideline 463 and the corresponding scales of the centroid guideline 464 corresponds to the positional relationship between the edges 103 and 104 and the centroid G/G' of the effective sealing surface. This facilitates an operator to adjust the line of action Lf (FIG. 13) to the centroid G'.

The heat seal device 4 capable of adjusting the line of action is also applicable when the centroid of the effective sealing surface is changed, as a result of the seal plate 46 being repositioned, the seal plate 46 being replaced with another seal plate having a differently shaped convex portion, or the entire first heat seal member 43 being replaced with another one.

The web 1 and thus the bag components 11, 12 and 13 may be made of either mono-material or hybrid material, as long as they allow heat-sealing and bag making to be implemented. For example, each of the bag components 11, 12 and 13 may be a multi-layered film including a base layer and a sealant layer as disclosed in Patent documents 1 to 3.

Although the heat seal device 4 in the implementation heat-seals the panel parts 11 and 12 and the gusset part 13, other components may be heat-sealed by the heat seal device 4. The gusset part 13 is not limited to a bottom gusset part as in the implementation, but may be a top gusset part or side gusset part. The arrangement of the heat seal device 4 in the bag making apparatus is also not limited to the example illustrated in FIG. 1A, but is determined according to the design of the bags to be made. It should be easily appreciated by those skilled in the art that the heat seal device 4 is applicable to various bag making methods instead of the bag making method in the implementations.

The primary biasing members 47 may be cylinders, e.g., air cylinders or electric cylinders, instead of springs. The secondary biasing members 50 may also be cylinders, for example, air or electric cylinders, instead of springs. The biasing force applied during heat-sealing can be adjusted by the adjustment of the fluid pressure (air pressure) and stroke. Since the biasing force can be determined based on the fluid pressure, it is possible to adjust the position of the above line of action Lf in a shorter time. The biasing force of the biasing member(s) 47/50 may be detected by a sensor.

Where electric cylinders are used as the primary and secondary biasing members 47 and 50, it is possible, for example, to control the biasing force of the electric cylinders 47 and the biasing force of the electric cylinders 50, respectively, after calculating the biasing force with the help of software, in order to match the line of action Lf of the combined force with the centroid G' of the effective sealing surface, as illustrated in FIG. 13.

A pressure sensor may be sandwiched between the seal plate 46 and the second heat seal member 44. It can be checked whether the line of action Lf passes through the centroid G' or not by using the measurement results of the pressure sensor.

The heat seal device 4 or bag making apparatus may further include a user interface, such as an operation panel consisting of a touch screen display. The heat seal device 4 or bag making apparatus may be configured to increase or decrease the biasing force of the primary biasing members 47 and the biasing force of the secondary biasing members 50, respectively, in response to the operation of the user interface by an operator. This can easily be performed with electric cylinders.

First, the biasing force by the electric cylinders 47 and 50 may be controlled based on a value calculated using software. Then, the above pressure sensor may be used to verify that the line of action Lf actually passes through the centroid G'. In addition, fine-adjustment may be performed by the operation of the user interface.

Alternative to the above implementations, three or more primary biasing members 47 may be arranged in a straight line. One, or three or more secondary biasing members 50 may be arranged offset in the second horizontal direction Y from the arrangement line L1.

Instead of the V-shape, the surface 461 may have any other shape compatible with the purpose, function and intended use of the sealed sections.

What is claimed is:

1. A heat seal device for heat-sealing bag components, comprising:
    a pair of supports disposed to be spaced from one another in a first horizontal direction;
    a beam supported by the pair of supports and extending in the first horizontal direction between the pair of supports;
    a slider configured to be movable in a vertical direction with respect to the beam;
    a first heat seal member configured to be moved together with the slider in the vertical direction;
    a second heat seal member facing the first heat seal member in the vertical direction;
    a vertical movement mechanism for moving the pair of supports and the beam in the vertical direction to move the slider and the first heat seal member towards and away from the second heat seal member;
    at least two primary biasing members located between the slider and the beam to bias the slider and the first heat seal member towards the second heat seal member when the bag components are sandwiched between the first and second heat seal members; and
    a secondary biasing member located between the slider and the beam to bias the slider and the first heat seal member towards the second heat seal member when the bag components are sandwiched between the first and second heat seal members,
    wherein the at least two primary biasing members are arranged in a straight line in the first horizontal direction,
    wherein the secondary biasing member is arranged offset from the at least two primary biasing members in a second horizontal direction perpendicular to the first horizontal direction; and
    wherein the heat seal device is configured to allow adjustment of biasing force applied to the first heat seal member by the secondary biasing member.

2. The heat seal device of claim 1, wherein the heat seal device is configured to allow the secondary biasing member to be adjusted to a state in which the secondary biasing member does not bias the first heat seal member when the bag components are sandwiched between the first and second heat seal members.

3. The heat seal device of claim 1, wherein the first heat seal member comprises:
    a base; and
    a seal plate configured to be detachably attached to the base, the seal plate comprising a convex portion having a surface that faces the second heat seal member when the seal plate is attached to the base, and
    wherein the heat seal device is configured to sandwich the bag components between the seal plate and the second heat seal member to heat-seal the bag components for forming a sealed section having a shape of the surface of the convex portion.

4. The heat seal device of claim 3, wherein the first heat seal member is configured such that the seal plate is attachable to the base at a plurality of different positions with respect to the second horizontal direction.

5. The heat seal device of claim 1, wherein the secondary biasing member is a spring or cylinder.

6. The heat seal device of claim 1, wherein the at least two primary biasing members are springs or cylinders.

7. A bag making apparatus comprising the heat seal device of claim 1.

* * * * *